United States Patent [19]
Kuran et al.

[11] Patent Number: 5,701,934
[45] Date of Patent: Dec. 30, 1997

[54] ROTARY DIVERTER VALVE

[75] Inventors: Christopher G. Kuran, Glendale; Harold John Valley, Fountain Valley; Raymond Eugene Hayes, Camarillo, all of Calif.

[73] Assignee: V. A. Butler, Inc., Chatsworth, Calif.

[21] Appl. No.: 594,683

[22] Filed: Feb. 2, 1996

[51] Int. Cl.⁶ .................................................. F16K 11/06
[52] U.S. Cl. .................... 137/625.46; 251/352; 239/27
[58] Field of Search .................... 137/625.46, 801; 251/352; 239/25, 26, 27

[56] References Cited

U.S. PATENT DOCUMENTS

| | | | |
|---|---|---|---|
| 3,079,088 | 2/1963 | Hermann et al. | 239/25 |
| 3,144,878 | 8/1964 | Williams | 137/801 X |
| 3,335,957 | 8/1967 | Jacobson | 239/25 |
| 4,161,191 | 7/1979 | Ranger et al. | 137/625.46 |
| 5,083,589 | 1/1992 | Wilcock | 137/625.29 |

OTHER PUBLICATIONS

One page sheet from Touch-Flo, Diverter Valves & Saddle Valves.
Butler catalog, pp. 1-5, Diverter Valves with Revolving Collars.

*Primary Examiner*—John Fox
*Attorney, Agent, or Firm*—Stetina Brunda Garred & Brucker

[57] ABSTRACT

A diverter valve comprising an upper housing section which defines a fluid inlet and a first fluid outlet. Rotatably connected to the upper housing section is a lower housing section which defines a second fluid outlet. The lower housing section is selectively rotatable between first and second positions. Disposed within the upper housing section is a diverter element which defines first and second flow conduits. The diverter element is attached to the lower housing section and rotatable concurrently therewith. The first flow conduit fluidly communicates with the fluid inlet and the second fluid outlet when the lower housing section is in the first position, with the second flow conduit fluidly communicating with the fluid inlet and the first fluid outlet when the lower housing section is in the second position.

13 Claims, 2 Drawing Sheets

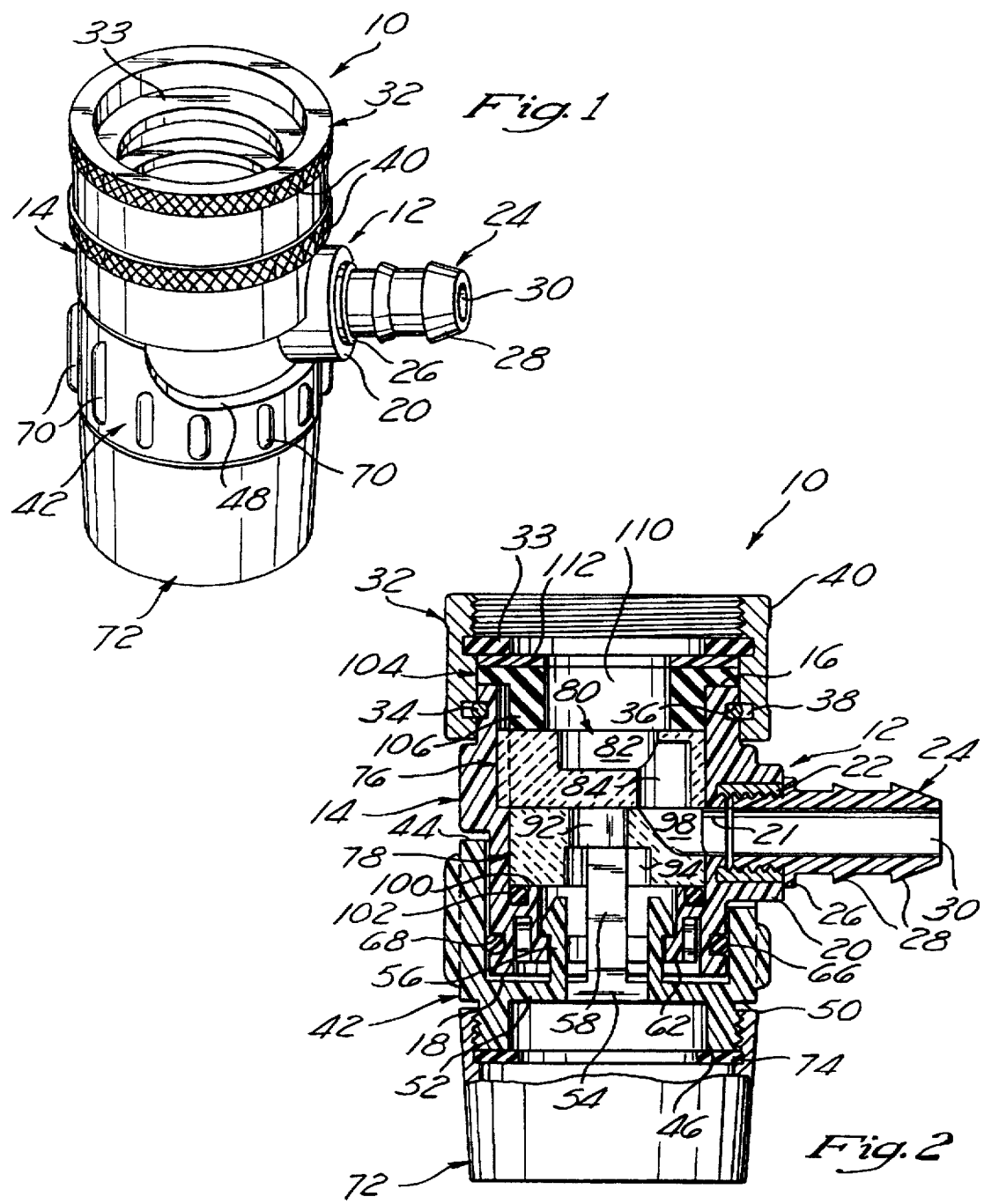

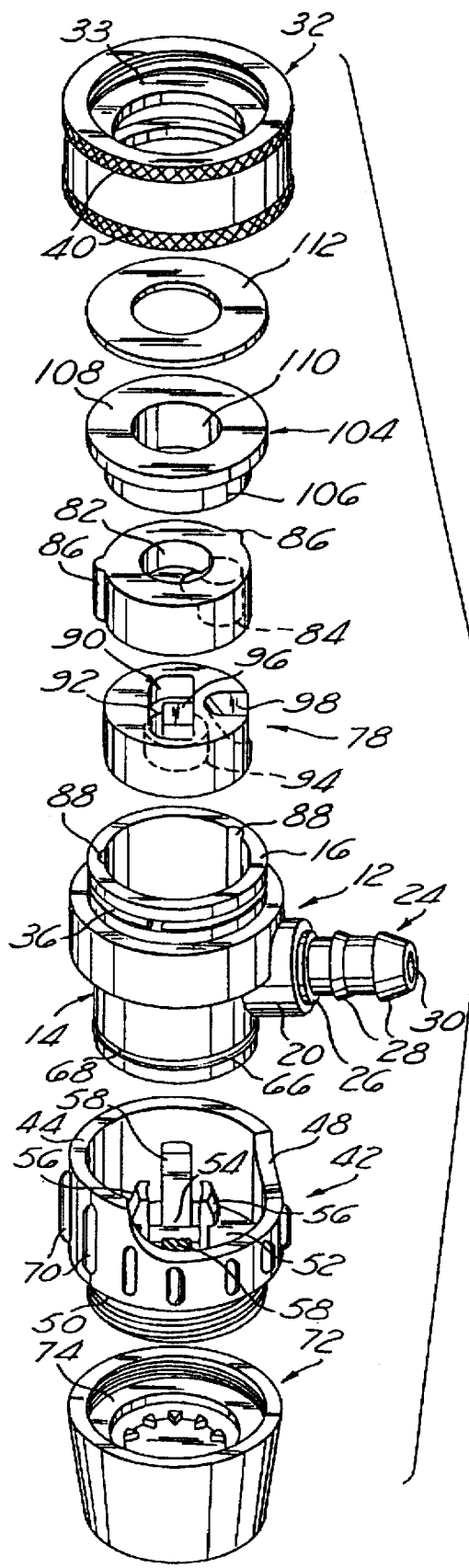
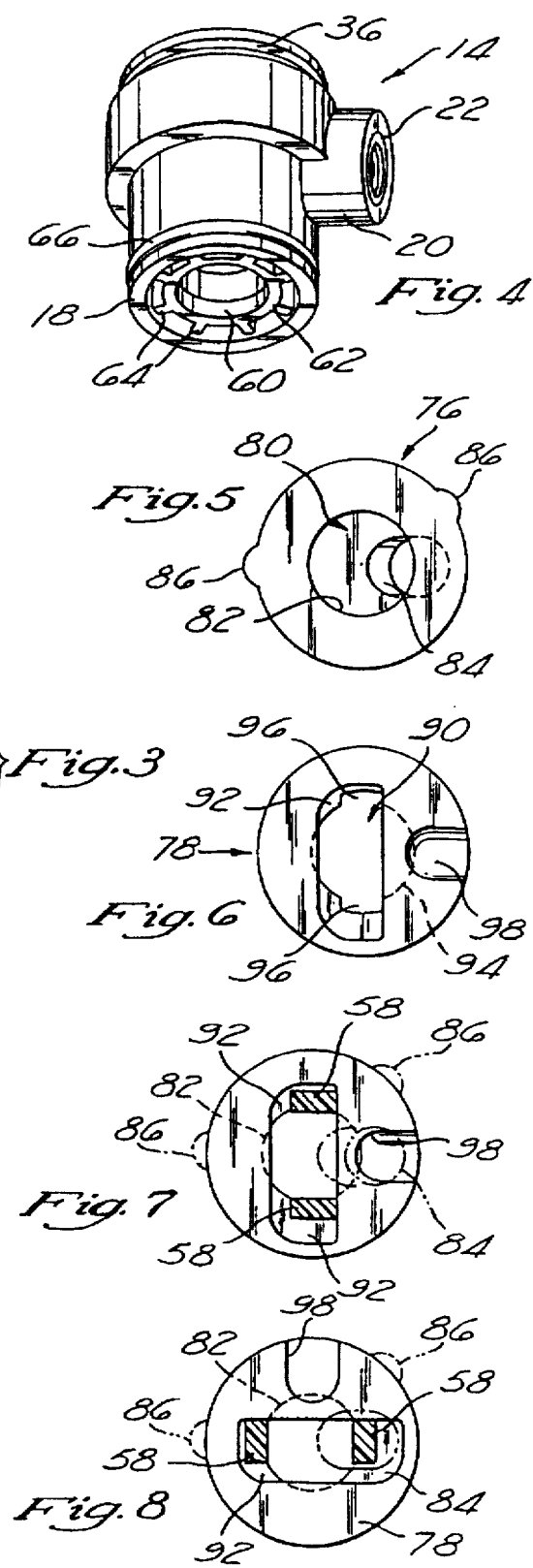

ROTARY DIVERTER VALVE

FIELD OF THE INVENTION

The present invention relates generally to fluid valves, and more particularly to a diverter valve which is attachable to a faucet for selectively diverting water from an aerator to an auxiliary fluid outlet.

BACKGROUND OF THE INVENTION

There is known in the prior art diverter valves which are attachable to kitchen or utility sink faucets and are used to selectively divert water from an aerator to an auxiliary water dispensing device such as a hand-held sprayer, water purifier/dispenser, or the like. Typically, such prior art valves comprise a single piece stainless steel housing. Rotatably connected to the top end of the housing is a stainless steel collar, while threadably engaged to the bottom end of the housing is a stainless steel aerator. Extending laterally from the housing is a tubular side port which is adapted to facilitate the connection of a fluid line to the housing. The collar is attached to the faucet, with water selectively being diverted from the aerator to the side port by actuating a valve member disposed within the housing.

In the prior art diverter valves, the valve member is actuated between a closed position (wherein water flows from the faucet through the aerator) to an open position (wherein water flows from the faucet through the side port) by manipulating a stem which also extends laterally from the housing. In this respect, pulling the stem outwardly from the housing typically moves the valve member to the open position, with the pushing of the stem into the housing moving the valve member to the closed position. The valve member (including the stem) typically comprises stainless steel components which have one or more rubber seals engaged thereto.

Though the prior art diverter valves effectively function to divert water from the faucet to an auxiliary water dispensing device, they possess certain deficiencies which detract from their overall utility. First, the fabrication of these prior art diverter valves from metal components of stainless steel or brass causes the cost thereof to be relatively high. Additionally, the valve member components, and particularly the rubber seals, are highly susceptible to wear during actuation of the valve member between its open and closed positions, and are prone to early failure, thus causing undesirable leakage through the auxiliary water dispensing device. Further, certain metals from which the prior art diverter valves are fabricated sometimes impart an unpleasant taste to drinking water when the diverter valve is used in conjunction with a drinking water dispensing device. The present invention overcomes these other deficiencies associated with the prior art by providing a diverter valve which is fabricated predominantly by plastic and ceramic components, thus greatly reducing its cost and its susceptibility to wear and failure, as well as eliminating any unpleasant taste imparted to drinking water.

SUMMARY OF THE INVENTION

In accordance with the present invention, there is provided a diverter valve which comprises an upper housing section defining a fluid inlet and a first fluid outlet. Rotatably connected to the upper housing section is a lower housing section which itself defines a second fluid outlet. The lower housing section is selectively rotatable between first and second positions. Disposed within the upper housing section is an upper diverter member which defines a first flow passage in fluid communication with the fluid inlet. Also disposed within the upper housing section is a lower diverter member which defines a second flow passage in fluid communication with the second fluid outlet, and a third flow passage selectively placeable into fluid communication with the first fluid outlet. The lower diverter member is attached to the lower housing section and rotates concurrently therewith. The second flow passage fluidly communicates with the first flow passage when the lower housing section is in the first position, with the third flow passage fluidly communicating with the first flow passage and the first fluid outlet when the lower housing section is in the second position.

In the preferred embodiment, the diverter valve constructed in accordance with the present invention further comprises an annular collar which is rotatably connected to the upper housing section and circumvents the fluid inlet. Additionally, attached to the lower housing section is an aerator which fluidly communicates with the second fluid outlet. The upper and lower housing sections are each preferably fabricated from a plastic material, with the upper and lower diverter members each preferably be fabricated from a ceramic material. The collar and aerator are themselves each preferably fabricated from a metal material, and more particularly brass.

The diverter valve constructed in accordance with the present invention further comprises a gasket having a cylindrical body portion which is partially disposed within the fluid inlet and abutted against the upper diverter member. Extending radially outward from the body portion is a flange portion which is abutted against the edge of the upper housing section defining the fluid inlet. The body portion defines a bore which fluidly communicates with the first flow passage of the upper diverter member. Abutted against the flange portion of the gasket is an annular friction washer. Both the friction washer and the flange portion of the gasket reside within the collar attached to the upper housing section.

The lower housing section of the diverter valve constructed in accordance with the present invention includes an outer surface having a plurality of gripper ribs formed thereon to aid in rotating the same between its first and second positions. Additionally, the upper housing section preferably comprises a main body having a tubular insert releasably attached thereto which defines the first fluid outlet. The insert includes an outer surface having a plurality of barbs formed thereon for facilitating the fluid connection of a tubular fluid line to the upper housing section. The upper housing section, and in particular the main body thereof, further includes an inner surface having a pair of channels formed therein. The channels are complimentary to and adapted to receive respective ones of a pair of locking tabs formed on the upper diverter member. The receipt of the locking tabs into the channels maintains the upper diverter member stationary when the lower housing section is moved between its first and second positions, thus rotating the lower diverter member which is attached thereto.

BRIEF DESCRIPTION OF THE DRAWINGS

These, as well as other features of the present invention, will become more apparent upon reference to the drawings wherein:

FIG. 1 is a top perspective view of the diverter valve constructed in accordance with the present invention;

FIG. 2 is a partial cross-sectional view of the diverter valve shown in FIG. 1;

FIG. 3 is an exploded view of the diverter valve shown in FIGS. 1 and 2;

FIG. 4 is a bottom perspective view of the main body of the upper housing section of the diverter valve;

FIG. 5 is a top plan view of the upper diverter member of the diverter valve;

FIG. 6 is a top plan view of the lower diverter member of the diverter valve;

FIG. 7 is a top plan view of the upper and lower diverter members as oriented relative to each other when the diverter valve is in a second position facilitating flow from a water source to an auxiliary water dispensing device; and FIG. 8 is a top plan view of the upper and lower diverter members as oriented relative to each other when the diverter valve is in a first position facilitating flow from a water source to the aerator of the diverter valve.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a rotary diverter valve 10 constructed in accordance with the present invention. Referring now to FIGS. 1–4, the diverter valve 10 comprises an upper housing section 12. The upper housing section 12 itself comprises a main body 14 (shown individually in FIG. 4) which is preferably fabricated from a plastic material and includes a top rim 16 and a bottom rim 18. The top rim 16 of the main body 14 defines a fluid inlet for the diverter valve 10. In addition to the top and bottom rims 16, 18, the main body 14 includes a cylindrically configured side port 20 defining an opening 21 which communicates with the hollow interior of the main body 14. As best seen in FIG. 2, the side port 20 further accommodates a tubular, internally threaded sleeve 22 which is preferably fabricated from a metal material such as stainless steel.

In addition to the main body 14, the upper housing section 12 comprises a tubular insert 24 which is also preferably fabricated from a plastic material and is releasably attachable to the main body 14. In particular, an externally threaded outer surface portion of the insert 24 adjacent one end thereof is threadably engaged to the complimentary, internally threaded sleeve 22. As further seen in FIG. 2, the receipt of the insert 24 into the sleeve 22 is limited by the abutment of an annular flange 26 formed on the outer surface of the insert 24 against the distal end of the side port 20. In addition to the flange 26, formed on the outer surface of the insert 24 are a plurality of barbs 28 which are adapted to frictionally maintain the insert 24 within a tubular fluid line extended thereover. When the insert 24 is fully received into the sleeve 22, the fluid passage 30 defined by the insert 24 communicates with the hollow interior of the main body 14 via a portion of the opening 21 included in the side port 20. Though not shown, since the insert 24 is threadably engaged to the main body 14 and hence releasably attached thereto, the same may be selectively replaced with inserts of differing outer diameters so as to facilitate the attachment of differently sized fluid lines to the upper housing section 12. When attached to the main body 14, the insert 24 defines a first fluid outlet of the diverter valve 10.

Referring now to FIGS. 1–3, rotatably connected to the main body 14 of the upper housing section 12 is an annular collar 32 which is preferably fabricated from a metal material, and in particular brass or stainless steel. When attached to the main body 14, the collar 32 circumvents the top rim 16, and hence the fluid inlet of the diverter valve 10. The rotatable connection of the collar 32 to the main body 14 is facilitated by a snap ring 34 which resides in a continuous channel 36 formed within and extending about the outer surface of the main body 14 adjacent the top rim 16 thereof. The snap ring 34 extends partially into a continuous groove 38 which is formed within and extends about the inner surface of the collar 32, as best seen in FIG. 2. As seen in FIGS. 2 and 3, a portion of the inner surface of the collar 32 is internally threaded to allow the same to be threadably engaged to a water source such as the faucet of a kitchen sink or utility sink. Additionally, portions of the outer surface of the collar 32 include knurling 40 to aid in gripping the collar 32 when threadably engaging the same to the water source. Secured within the collar 32 and extending radially inward from its inner surface adjacent the internally threaded portion thereof is an annular rubber seal 33, the use of which will be discussed in more detail below.

In addition to the upper housing section 12, the diverter valve 10 constructed in accordance with the present invention further comprises a lower housing section 42 which is rotatably connected to the upper housing section 12. The lower section 42 itself includes a top rim 44 and a bottom rim 46 which defines a second fluid outlet of the diverter valve 10. Like the upper housing section 12 (and in particular the main body 14 and insert 24), the lower housing section 42 is preferably fabricated from a plastic material. As will be discussed in more detail below, the lower housing section 42 is selectively rotatable between first and second positions which allow water to be channeled alternatively through either the first or second fluid outlets.

As seen in FIG. 3, the lower housing section 42 is formed to include a relatively large, radiused recess 48 within the top rim 44 thereof. The bottom rim 46 is included on a reduced diameter, externally threaded lower portion of the lower housing section 42 which is separated from an upper portion of the lower housing section 42 by an annular shoulder 50. Formed on and extending inwardly from the inner surface of the lower housing section 42 approximately between the upper and lower portions thereof is a wall 52 which defines a central opening 54, as best seen FIG. 2. As seen in FIGS. 2 and 3, extending upwardly in opposed relation (i.e., separated by approximately 180 degrees) from the inner edge of the wall 52 which defines the opening 54 is a pair of identically configured attachment members 56, each of which is formed to include an enlarged, generally wedge-shaped distal end or head. Also extending upwardly in opposed relation from the inner edge of the wall 52 which defines the opening 54 is a pair of identically configured engagement tabs 58 which are rectangularly configured and have a length exceeding that of the attachment members 56. The engagement tabs 58 are themselves separated from the attachment members 56 by intervals of approximately 90 degrees. The use of the attachment members 56 and engagement tabs 58 will be discussed in more detail below.

Referring now to FIGS. 2 and 4, as previously indicated, the lower housing section 42 is rotatably connected to the upper housing section 12 and selectively rotatable between first and second positions. Such rotatable connection is facilitated by the advancement of the upper portion of the lower housing section 42 over the reduced diameter lower portion of the upper housing section 12. Such advancement causes the attachment members 56 and engagement tabs 58 to be extended through the aperture 60 of a circularly configured wall 62 concentrically positioned within the main body 14 in close proximity to the bottom rim 18 thereof. As best seen in FIG. 4, the wall 62 is supported by a plurality of splines 64 which extend between the outer surface thereof and the inner surface of the main body 14 in equidistantly spaced relation to each other. It will be recognized that the wall 62 and splines 64 are formed as integral portions of the main body 14.

When the attachment members 56 and engagement tabs 58 are extended through the aperture 60, the enlarged heads of the attachment members 56 engage the top edge of the wall 62. The extension of the attachment members 56 through the aperture 60 is aided by the beveled regions of the heads thereof. In this respect, because the distance separating the outermost portions of the enlarged heads of the attachment members 56 from each other exceeds the diameter of the aperture 60, the attachment members 56 are flexed inwardly when extended through the aperture 60, and resiliently return to their unflexed condition when the heads thereof clear the top edge of the wall 62. Due to the configuration of the wall 62, the engagement of the heads of the attachment members 56 thereto allows the lower housing section 42 to be rotated relative to the upper housing section 12, but prevents the upper and lower housing sections 12, 42 from being separated from each other. As further seen in FIG. 2, an O-ring 66 is provided in a continuous slot 68 which is formed within and extends about the outer surface of the main body 14 adjacent its bottom rim 18. The O-ring 66 creates a fluid-tight seal between the upper and lower housing sections 12, 42 when they are rotatably connected to each other.

Referring now to FIGS. 1 and 3, when the lower housing section 42 is rotatably connected to the upper housing section 12 in the aforementioned manner, approximately the bottom half of the side port 20 of the main body 14 is received into the recess 48 formed in the lower housing section 42. When the lower housing section 42 is in the second position (causing water to be channelled from the fluid inlet to the first fluid outlet), the side port 20 is abutted against one end of the recess 48 as shown in FIG. 1. When the lower housing section 42 is in the first position (causing water to be channelled from the fluid inlet to the second fluid outlet), the side port 20 is abutted against the other end of the recess 48 (i.e., the end opposite that shown in FIG. 1). As will be recognized, the side port 20 travels along the length of the recess 48 during the movement of the lower housing section 42 between its first and second positions.

To aid in its rotation, the outer surface of the lower housing section 42, and in particular its upper portion, is provided with a plurality of gripper ribs 70 formed thereon. Those gripper ribs 70 disposed adjacent the recess 48 are shorter in length than those that extend to the top rim 44 of the lower housing section 42. As seen in FIGS. 2-3, threadably engaged to the externally threaded lower portion of the lower housing section 42 is an aerator 72 which is preferably fabricated from a metal material, and in particular brass or stainless steel. The aerator 72 fluidly communicates with the second fluid outlet (defined by the bottom rim 46 of the lower housing section 42) and functions in a conventional manner when water flows therethrough. Captured between the aerator 72 and the bottom rim 46 of the lower housing section 42 is an annular sealing washer 74.

Referring now to FIGS. 2, 3 and 5-8, disposed within the hollow interior of the main body 14 of the upper housing section 12 in stacked relation to each other are a upper diverter member 76 (shown in FIG. 5) and a lower diverter member 78 (shown in FIG. 6). The upper diverter member 76 has a generally circular configuration, and defines a first flow passage 80 which fluidly communicates with the fluid inlet defined by the top rim 16 of the main body 14. The first flow passage 80 is itself defined by a circularly configured upper flow passage segment 82 which extends from the top surface of the upper diverter member 76 to approximately the center thereof, and a lower flow passage segment 84 which is offset toward one side of the upper diverter member 76 and extends from a corner region of the upper flow passage segment 82 to the bottom surface of the upper diverter member 76. Formed on the peripheral outer surface of the upper diverter member 76 is a pair of locking ribs or tabs 86 which are slidably insertable into respective ones of a complimentary pair of channels 88 formed in the inner surface of the upper portion of the main body portion 14, as best seen in FIG. 3. The receipt of the locking tabs 86 into the channels 88 maintains the upper diverter member 76 stationary within the main body 14, for reasons which will be discussed in more detail below.

Like the upper diverter member 76, the lower diverter member 78 also has a circular configuration. Disposed within the lower diverter member 78 is a second flow passage 90 which fluidly communicates with the second fluid outlet defined by the bottom rim 46 of the lower housing section 42. The second flow passage 90 defines a generally D-shaped upper section 92 which extends from the top surface of the lower diverter member 48 to approximately the center thereof, and a circularly configured lower section 94 which extends from the bottom of the upper section 92 to the bottom surface of the lower diverter member 78. The lower section 94 of the second flow passage 90 itself includes an opposed pair of recesses 96 formed in the peripheral wall thereof. In addition to the second flow passage 90, also disposed within the lower diverter member 78 is a third flow passage 98. The third flow passage 98 is formed in a peripheral corner region of the lower diverter member 78, and extends between the top and side surfaces thereof. In the diverter valve 10, the upper and lower diverter members 76, 78 are each preferably fabricated from a ceramic material.

When the diverter valve 10 is assembled, the lower diverter member 78 is initially advanced through the top rim 16 of the main body 14, bottom surface first. The advancement of the lower diverter member 78 into the hollow interior of the main body 14 is limited by the abutment of its bottom surface against an annular flange 100 formed on and extending radially inward from the inner surface of the lower portion of the main body 14. As seen in FIG. 2, the flange 100 is itself integrally connected to the top edge of the wall 62. Disposed within the top surface of the flange 100 is an annular channel which accommodates an O-ring 102. In this respect, when the lower diverter member 78 is abutted against the flange 100, a fluid-tight seal is created between the O-ring 102 and the peripheral region of the bottom surface of the lower diverter member 78.

When the lower diverter member 78 is properly oriented within the main body 14, the engagement tabs 58 of the lower housing section 42 are received into respective ones of the recesses 96 formed within the lower section 94 of the second flow passage 90. The recesses 96 are sized and configured to accommodate the attachment members 56 (as seen in FIGS. 7 and 8), the lengths of which are such that the distal ends thereof terminate at approximately the upper section 92 of the second flow passage 90 (as seen in FIG. 2). Importantly, the receipt of the engagement tabs 58 into the recesses 96 causes the lower diverter member 78 to be rotated concurrently with the lower housing section 42. Despite such rotation, the fluid-tight seal is maintained between the bottom surface of the lower diverter member 78 and the flange 100 by the O-ring 102. The importance of the rotation of the lower diverter member 78 will be discussed in more detail below.

Subsequent to the placement of the lower diverter member 78 into the interior of the main body 14, the upper diverter member 76 is advanced through the top rim 16 bottom surface first, with the locking tabs 86 being slidably extended into respective ones of the channels 86 formed in the inner surface of the upper portion of the main body 14. The advancement of the upper diverter member 76 into the main body 14 is limited by the direct abutment of the bottom surface thereof against the top surface of the lower diverter member 78. Importantly, the locking tabs 86 and channels 88 are oriented such that when the upper diverter member 76 is properly oriented within the main body 14, the lower flow passage segment 84 of the first flow passage 80 is directed toward the side port 20, and hence the insert 24, as seen in FIG. 2.

Referring now to FIGS. 2 and 3, subsequent to the placement of the upper diverter member 76 into the interior of the main body 14, but prior to the rotatable connection of the collar 32 thereto, a gasket 104 is partially advanced into the fluid inlet defined by the top rim 16 of the main body 14. The gasket 104 includes a cylindrically configured body portion 106, the bottom end of which is abutted against the top surface of the upper diverter member 76 when the gasket 104 is fully inserted into the main body 14. In addition to the body portion 106, the gasket 104 includes a flange portion 108 which extends radially outward from the top end of the body portion 106 and is abutted against the top rim 16 of the main body 14. The flange portion 108 is sized such that the peripheral edge thereof is substantially flush with the peripheral edge of the top rim 16. Extending axially through the gasket 104 is a bore 110 which fluidly communicates with the first flow passage 80, and in particular the upper flow passage segment 82 thereof.

Subsequent to the insertion of the gasket 104 into the main body 14, an annular friction washer 112 is positioned upon the top surface of the flange portion 108. Thereafter, the collar 32 is rotatably connected to the main body 14 in the aforementioned manner, with the friction washer 12 being captured between the seal 33 and flange portion 108 of the gasket 104. As will be recognized, when the collar 32 is threadably engaged to the water source (e.g., a faucet), the seal 33 is compressed by the end of the water source, thus forming a fluid-tight seal between the water source and the diverter valve 10.

Having thus described the components comprising the diverter valve 10, the operation thereof will now be described with particular reference to FIGS. 1, 2, 7 and 8. When the lower housing section 42 is in the first position (shown in FIG. 8), the lower flow passage segment 84 of the first flow passage 80 is generally aligned with an end region of the upper section 92 of the second flow passage 90. As such, water entering the diverter valve 10 from the water source will flow through the bore 110, first flow passage 80 (including the upper and lower flow passage segments 82, 84), second flow passage 90 (including the upper and lower sections 92, 94), aperture 60 (as well as the spaces defined between the wall 62 and inner surface of the lower portion of the lower housing section 42), and aerator 72. When the lower housing section 42 is in the first position, the third flow passage 98 is separated from the opening 21 of the side port 20, and hence the insert 24, by an interval of approximately 90 degrees.

When the lower housing section 42 is rotated to the second position (as shown in FIGS. 1, 2 and 7) thus causing the side port 20 to travel to the opposite end of the recess 48, the third flow passage 98 is rotated approximately 90 degrees to the opening 21 due to the lower diverter member 78 being attached to the lower housing section 42 and rotating concurrently therewith. In this respect, when the lower housing section 42 is in the second position, water flows from the water source through the bore 110, the first flow passage 80 (including the upper and lower flow passage segments 82, 84), the third flow passage 98, a small segment of the opening 21, and the fluid passage 30 of the insert 24. As such, water may be selectively channeled to either the aerator 72 or insert 24 simply by rotating the lower housing section 42 between its first and second positions. Importantly, despite the upper and lower diverter members 76, 78 being abutted against each other within the main body 14, the upper diverter member 76 is prevented from being rotated by the lower diverter member 78 (and thus remains stationary within the main body 14) by the receipt of the locking tabs 86 into the channels 88.

As previously explained, in the diverter valve 10, the upper housing section 12 (including the main body 14 and insert 24) and lower housing section 42 are each fabricated from a plastic material, with the upper and lower diverter members 76, 78 each being fabricated from a ceramic material. Thus, since only the collar 38 and aerator 72 are fabricated from a metal material, the diverter valve 10 constructed in accordance with the present invention is considerably less costly to manufacture than the prior art diverter valves. Additionally, the ceramic construction of the upper and lower diverter members 76, 78 (which are the primary water channeling components) make the diverter valve 10 of the present invention less susceptible to wear and failure than those of the prior art. Further, the use of plastic and ceramic for the primary components of the diverter valve 10 prevents a metal taste from being imparted to drinking water thereby. Moreover, the switching of the water flow path between the insert 24 and aerator 72 is quickly and easily accomplished through the rotation of the lower housing section 42.

Additional modifications and improvements of the present invention may also be apparent to those skilled in the art. Thus, the particular combination of parts described and illustrated herein is intended to represent only one embodiment of the present invention, and is not intended to serve as limitations of alternative devices within the spirit and scope of the invention.

What is claimed is:

1. A diverter valve comprising:
   an upper housing section defining a fluid inlet and a first fluid outlet;
   a lower housing section rotatably connected to said upper housing section and defining a second fluid outlet, said lower housing section being selectively rotatable between first and second positions;
   an upper diverter member disposed within said upper housing section and defining a first flow passage in fluid communication with said fluid inlet; and
   a lower diverter member disposed within said upper housing section and defining a second flow passage in fluid communication with said second fluid outlet and a third flow passage selectively placeable into fluid communication with said first fluid outlet, said lower diverter member being attached to said lower housing section and rotatable concurrently therewith;
   said second flow passage fluidly communicating with the first flow passage when the lower housing section is in the first position, and said third flow passage fluidly communicating with the first flow passage and the first fluid outlet when the lower housing section is in the second position.

2. The diverter valve of claim 1 further comprising an annular collar attached to the upper housing section and circumventing said fluid inlet, and an aerator attached to the lower housing section and fluidly communicating with said second fluid outlet.

3. The diverter valve of claim 2 wherein the collar is rotatably connected to the upper housing section.

4. The diverter valve of claim 2 wherein the upper and lower housing sections are each fabricated from a plastic material, the upper and lower diverter members are each fabricated from a ceramic material, and the collar and the aerator are each fabricated from a metal material.

5. The diverter valve of claim 4 wherein the metal material comprises brass.

6. The diverter valve of claim 2 further comprising:

a gasket having a cylindrical body portion partially disposed within said fluid inlet and abutted against said upper diverter member, and a flange portion extending radially outward from said body portion and abutted against an edge of said upper housing section which defines said fluid inlet, said body portion defining a bore which fluidly communicates with the first flow passage; and an annular friction washer abutted against the flange portion of the gasket, said friction washer and said flange portion residing within the collar.

7. The diverter valve of claim 1 wherein the lower housing section includes an outer surface having a plurality of gripper ribs formed thereon.

8. The diverter valve of claim 1 wherein the upper diverter member includes a pair of locking tabs formed thereon, and the upper housing section includes an inner surface having a pair of channels formed therein which are complimentary to and adapted to receive respective ones of the locking tabs to maintain the upper diverter member stationary when the lower housing section is moved between the first and second positions thus rotating the lower diverter member.

9. The diverter valve of claim 1 wherein said upper housing section comprises a main body having a tubular insert releasably attached thereto which defines the first fluid outlet, said insert including an outer surface having a plurality of barbs formed thereon.

10. A diverter valve comprising:

a plastic upper housing section defining a fluid inlet and a first fluid outlet;

a plastic lower housing section rotatably connected to said upper housing section and defining a second fluid outlet, said lower housing section being selectively rotatable between first and second positions; and a ceramic diverter element disposed within said upper housing section and defining first and second flow conduits, said diverter element being attached to said lower housing section and rotatable concurrently therewith;

said first flow conduit fluidly communicating with said fluid inlet and said second fluid outlet when the lower housing section is in the first position, and said second flow conduit fluidly communicating with said fluid inlet and said first fluid outlet when the lower housing section is in the second position.

11. The diverter of claim 10 further comprising a collar rotatably connected to the upper housing section and circumventing the fluid inlet, and an aerator attached to said lower housing section and fluidly communicating with said second fluid outlet.

12. The diverter of claim 11 wherein the collar and the aerator are each fabricated from a metal material.

13. The diverter valve of claim 10 wherein said diverter element comprises:

a stationary upper diverter member defining a first flow passage in fluid communication with the fluid inlet; and a rotatable lower diverter member attached to said lower housing section and defining a second flow passage in fluid communication with said second fluid outlet, and a third flow passage selectively placeable into fluid communication with said first fluid outlet;

said first and second flow passages fluidly communicating with each other and defining the first flow conduit when the lower housing section is in the first position, and said first and third flow passages fluidly communicating with each other and defining the second flow conduit when the lower housing section is in the second position.

* * * * *